United States Patent
Kwon et al.

(10) Patent No.: US 7,754,372 B2
(45) Date of Patent: Jul. 13, 2010

(54) LITHIUM SECONDARY BATTERY

(75) Inventors: Teak Hyen Kwon, Yongin-si (KR); Chang Kyu Shin, Yongin-si (KR); Hoon Yim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1154 days.

(21) Appl. No.: 11/377,950

(22) Filed: Mar. 16, 2006

(65) Prior Publication Data

US 2006/0216578 A1    Sep. 28, 2006

(30) Foreign Application Priority Data

Mar. 24, 2005    (KR) ...................... 10-2005-0024669

(51) Int. Cl.
H01M 2/12    (2006.01)
H01M 2/28    (2006.01)

(52) U.S. Cl. ......................................... 429/53; 429/161

(58) Field of Classification Search .................. 429/53, 429/56, 162, 161
See application file for complete search history.

(56) References Cited

U.S. PATENT DOCUMENTS

| | | | | |
|---|---|---|---|---|
| 5,985,478 A | * | 11/1999 | Kim | 429/53 |
| 6,444,348 B1 | * | 9/2002 | Saijo et al. | 429/53 |
| 7,541,110 B2 | * | 6/2009 | Jeon | 429/161 |

* cited by examiner

*Primary Examiner*—Patrick Ryan
*Assistant Examiner*—Julian Mercado
(74) *Attorney, Agent, or Firm*—Christie, Parker & Hale, LLP

(57) ABSTRACT

A lithium secondary battery having a cap assembly including a cap plate, an insulation plate and a terminal plate. The insulation plate and the terminal plate each have a predetermined vent hole corresponding to a safety vent formed on the cap plate so that if the secondary battery is dropped, an electrolyte passes through the vent-holes and undergoes a pressure reduction, thereby preventing fracture of a safety vent by the electrolyte while allowing gas to be exhausted upon battery overcharge, full discharge or by overheating.

16 Claims, 7 Drawing Sheets

LITHIUM SECONDARY BATTERY

CROSS-REFERENCE TO RELATED APPLICATIONS

This application claims priority to and the benefit of Korean Patent Application No. 10-2005-0024669, filed on Mar, 24, 2005, in the Korean Intellectual Property Office, the entire content of which is incorporated herein by reference.

BACKGROUND OF THE INVENTION

1. Field of the Invention

The present invention relates to a lithium secondary battery, and more particularly, to a lithium secondary battery having an improved safety vent structure.

2. Description of the Prior Art

As portable wireless devices such as a video cameras, portable phones, portable computers, and the like have light weight and multi-functions, secondary batteries used as a driving electric source have been researched. The secondary batteries include a nickel cadmium battery, a nickel hydrogen battery, a nickel zinc battery, a lithium secondary battery, and the like. Among these secondary batteries, the secondary battery is a rechargeable battery which may have a large capacity and a compact size. Furthermore, the lithium secondary battery has a high operation voltage and a high energy density per unit weight, so it is popularly used for the latest electronic devices.

FIG. 1A is an exploded perspective view showing a conventional lithium secondary battery. The lithium secondary battery is manufactured in such a manner that an electrode assembly 112 including a first electrode plate 115, a second electrode plate 113, and a separator 114 is received along with an electrolyte in the can 110 and then a cap assembly 120 tightly seals an upper opening 110a of the can 110. Typically, the first electrode plate 115 constitutes a negative electrode plate, while the second electrode plate 113 forms a positive electrode plate.

The cap assembly 120 includes a cap plate 140, an insulation plate 150, a terminal plate 160, and an electrode terminal 130. The cap assembly 120 is associated with a separate insulation case 170 and is then coupled to the upper opening 110a of the can 110 so as to seal the can 110.

The cap plate 140 is made from a metal plate having a size and shape corresponding to the upper opening 110a of the can 110. The cap plate 140 has a perforated hole 141 formed at a center portion thereof into which the electrode terminal 130 is inserted. When the electrode terminal 130 is inserted into the perforated hole 141, the electrode terminal 130 has a insulation gasket 135 mounted thereon and is inserted along with the insulation gasket 135 into the perforated hole 141 in order to insulate the electrode terminal 130 and the cap plate 140. The cap plate 140 has a safety vent 146 formed at a first side thereof, and an electrolyte injection hole 142 formed at a second side thereof. The electrolyte injection hole 142 has a predetermined size. After the cap assembly 120 is assembled to the upper opening 110a of the can 110, the electrolyte is injected through the electrolyte injection hole 142 into the can 110. Then, the electrolyte injection hole 142 is sealed by a plug 143.

Referring to FIG. 1B, the safety vent 146 has an upper groove 148 concavely facing away from the electrode assembly and a lower groove 147 facing toward the electrode assembly 112 which are formed by a desired depth on upper and lower surfaces of the cap plate 140 respectively. The safety vent 146 may have a larger cross-section area at its center than at its periphery so that it can be destroyed by a pressure of gas created due to overcharge and full discharge of the secondary battery or by overheating of the secondary battery, thereby exhausting the gas from the secondary battery and preventing an explosion of the secondary battery.

The electrode terminal 130 is connected either to a first electrode tab 117 of the first electrode plate 115, or to a second electrode tab 116 of the second electrode plate 113, so as to act as either a negative terminal or as a positive terminal.

The insulation plate 150 is made from the same insulation material as that of the insulation gasket 135. The insulation plate 150 has a perforated hole 151 formed at a portion thereof corresponding to the perforated hole 141 of the cap plate 140, into which an electrode terminal 130 is inserted. Furthermore, the insulation plate 150 has a receiving groove 152 formed on a lower surface thereof in order to receive the terminal plate 160. The receiving groove 152 has a size corresponding to that of the terminal plate 160. The receiving groove 152 can be omitted if there are no rotation forces on the terminal plate 160.

The terminal plate 160, made of nickel alloy, is attached to the lower surface of the insulation plate 150. The terminal plate 160 has a perforated hole 161 formed at a portion thereof corresponding to the perforated hole 141 of the cap plate 140, into which the electrode terminal 130 is inserted. Since the electrode terminal 130 is insulated by the insulation gasket 135 from the cap plate 140 and passes through the perforated hole 141 of the cap plate 140, the terminal plate 160 is electrically insulated from the cap plate 140 while being electrically connected to the electrode terminal 130.

The upper opening 110a of the can 110 is sealed by the cap assembly 120, and then the electrolyte is injected through the electrolyte injection hole 142 into the can 110. Next, the electrolyte injection hole is sealed by a separate plug 143, thereby achieving the secondary battery. When the electrolyte is injected into the can 110, the electrolyte is filled to a certain level such that the can has some remaining space. Accordingly, the electrolyte moves freely in the can 110. If the lithium secondary battery is dropped or otherwise subjected to a large force, the electrolyte may impact the safety vent. Since the safety vent formed in the cap plate is very fragile, the impact of the electrolyte on the safety vent may cause the safety vent to rupture causing the electrolyte to leak from the can and resulting in degradation of the safety of the secondary battery.

SUMMARY OF THE INVENTION

A lithium secondary battery is provided having a cap assembly including an insulation plate and a terminal plate each having a vent hole corresponding to a safety vent formed at one side of a cap plate. The vent holes allow electrolyte in a dropped lithium secondary battery to pass through a thereby and undergo pressure reduction, preventing rupture of the safety vent by the electrolyte.

The lithium secondary battery includes an electrode assembly including a first electrode plate, a second electrode plate, and a separator; a can adapted to receive the electrode assembly and an electrolyte; and a cap assembly for tightly sealing the can, the cap assembly being coupled to an upper opening of the can and including a cap plate, an insulation plate, a terminal plate, and an electrode terminal, wherein the cap plate has a safety vent formed at a side of the cap plate, and the insulation plate has a insulation plate vent-hole formed to correspond to the safety vent when the insulation plate is coupled to the cap plate.

According to exemplary embodiments of the present invention, the insulation plate vent-hole may be formed to be smaller than the safety vent. Specifically, the area of the insulation plate vent-hole may be between about 30% to about 70% of the area of the safety vent.

The terminal plate has a terminal plate vent-hole formed at a position corresponding to the insulation plate vent-hole when the terminal plate is assembled with the insulation plate. The terminal plate vent-hole may have substantially the same size or be smaller than the insulation plate vent-hole.

According to the present invention, the first electrode plate forms a negative plate, and the second electrode plate forms a positive electrode plate.

DETAILED DESCRIPTION

Figure 1A:
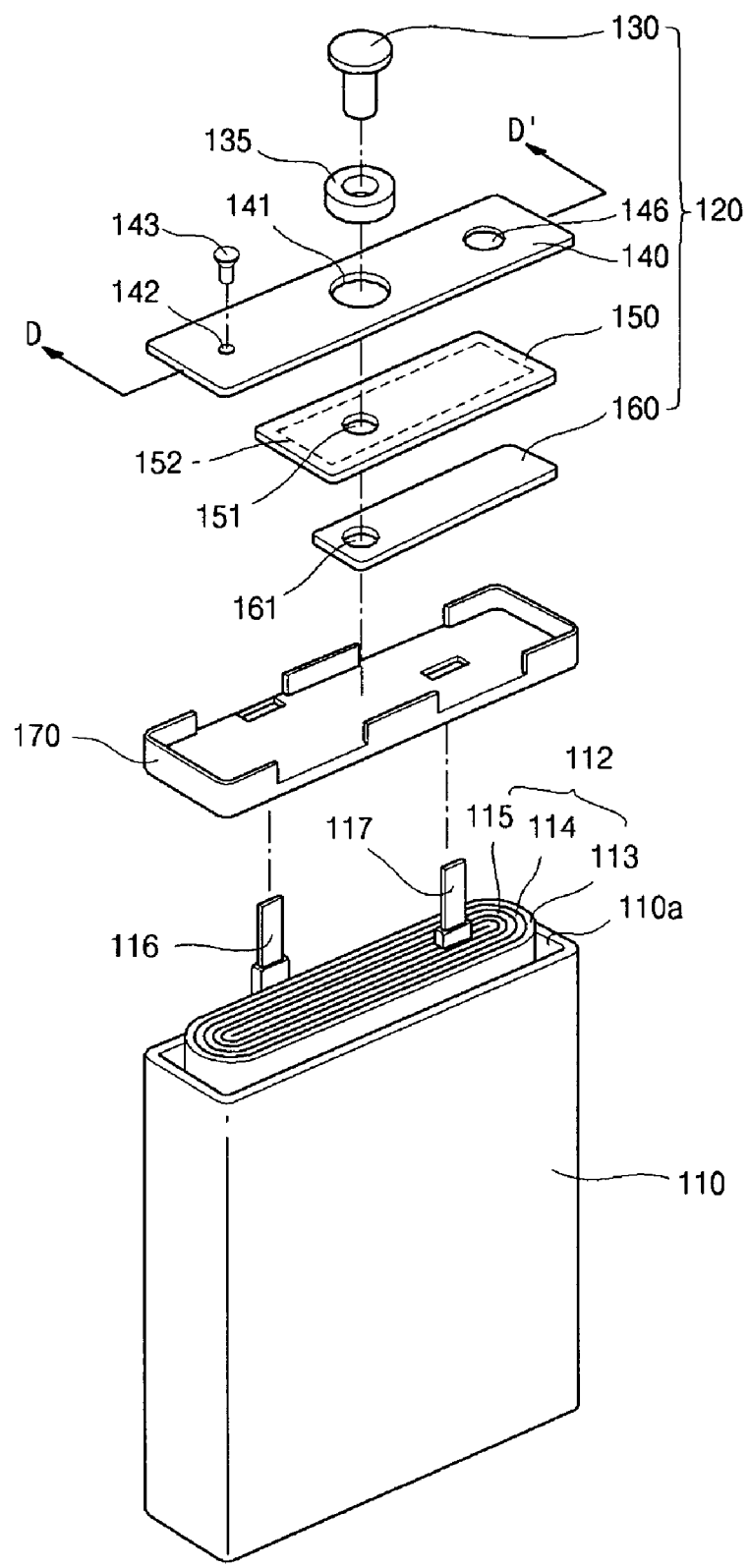
FIG. 1A is an exploded perspective view showing a conventional lithium secondary battery.
Figure 1B:
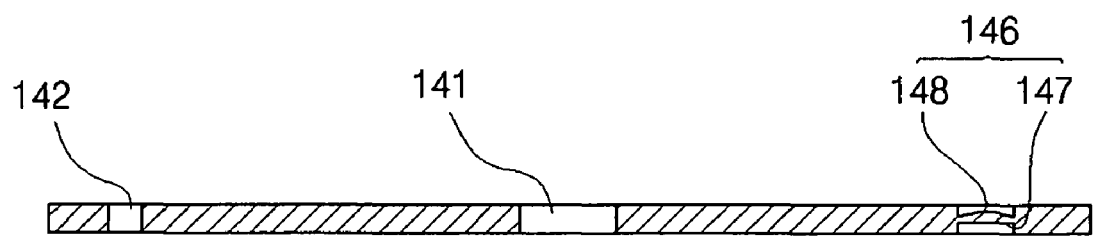
FIG. 1B is a cross-sectional view showing a cap plate of FIG. 1A taken along line D-D'.
Figure 2:
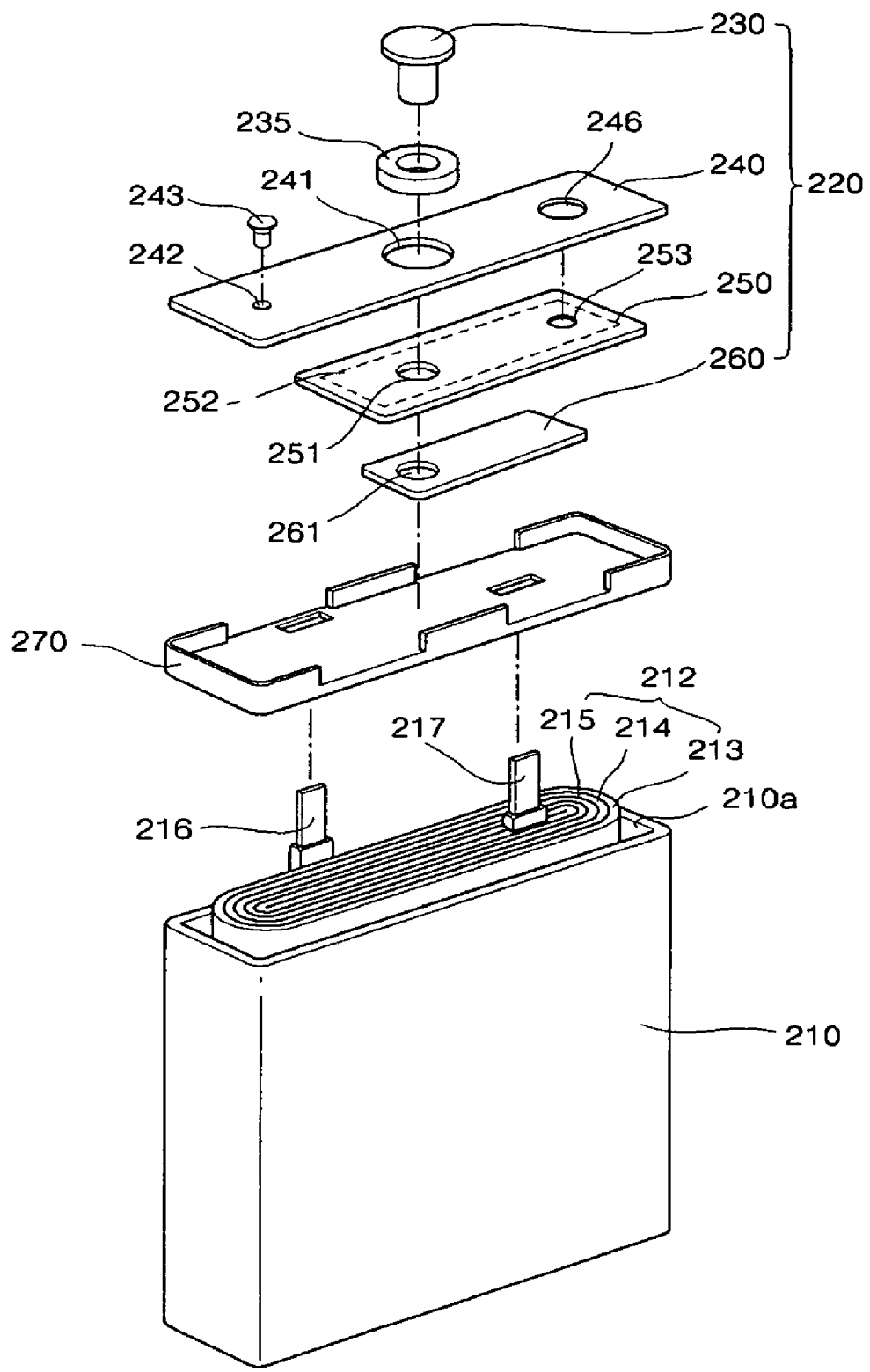
FIG. 2 is an exploded perspective view showing a lithium secondary battery according to the present invention.

Referring to FIG. 2, the lithium secondary battery according to the present invention includes a can 210, an electrode assembly 212 received in the can 210, and a cap assembly 220 for tightly sealing an upper opening 210a of the can 210.

The can 210 has a generally hexahedronal shape and is made of metal, for example, light aluminum or aluminum alloy. The can 210 has its upper opening 210a at an upper end thereof, and can receive the electrode assembly 212 through the upper opening 210a.

The electrode assembly 212 includes a second electrode plate 213, a first electrode plate 215, and separator 214. The first and second electrode plates 215, 213 are stacked to have the separator 214 interposed between them and are wound in a jelly-roll configuration. The second electrode plate 213 has a second electrode tab 216 welded thereto, of which an end portion protrudes from the electrode assembly 212. The first electrode plate 215 also has a first electrode tab 217 welded thereto, of which an end portion also protrudes from the electrode assembly 212. Typically, the first electrode plate 215 and the first electrode tab 217 constitute a negative plate and a negative tab, respectively. The second electrode plate 213 and the second electrode tab 216 constitute a positive plate and a positive tab, respectively. However, the positive and negative plates and tabs may also have their opposite polarity depending on the kind of secondary battery.

The cap assembly 220 includes a cap plate 240, an insulation plate 250, a terminal plate 260, and an electrode terminal 230. The cap assembly 220 is assembled with a separated insulation case 270 and coupled to the upper opening 210a, so as to tightly seal the can 210.

Figure 3A:
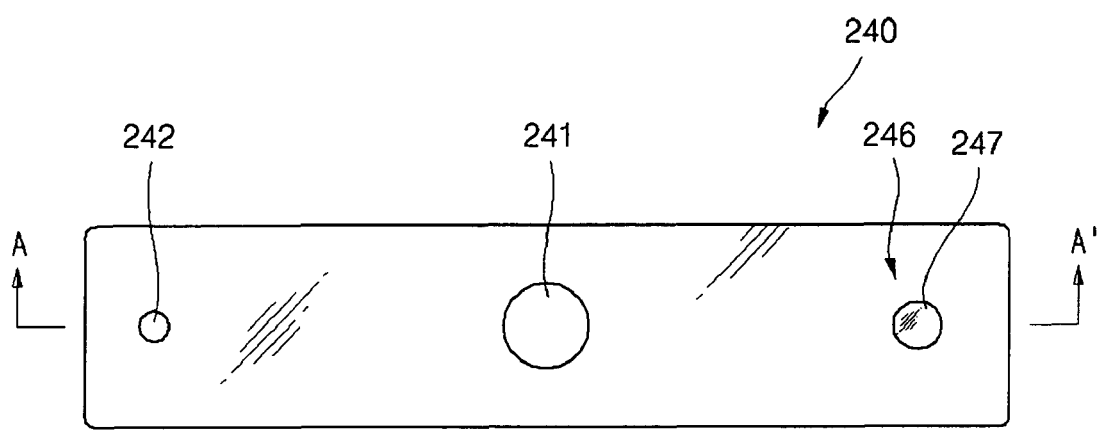
FIG. 3A is a plan bottom view showing a cap plate of the lithium secondary battery according to the present invention shown in FIG. 2.
Figure 3B:
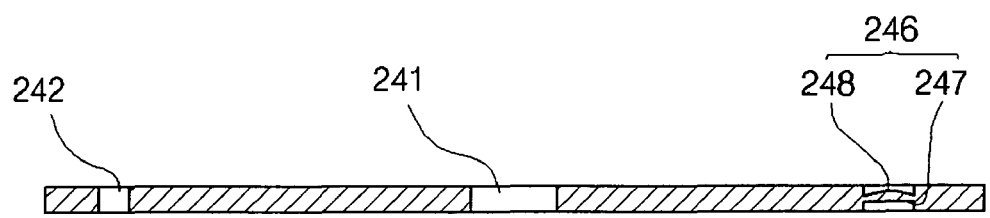
FIG. 3B is a sectional view showing the cap plate of FIG. 3A taken along line A-A'.

Referring now to FIGS. 3A and 3B, the cap plate 240 is a metal plate and has a size and a shape corresponding to the upper opening 210a. A perforated hole 241 is formed at a center of the cap plate 240 into which an electrode terminal 230 is inserted. An insulation gasket 235 (as seen in FIG. 2) is coupled to the perforated hole 241 in order to insulate the electrode terminal 230 and the cap plate 240.

A safety vent 246 is formed at a side of the cap plate 240. The safety vent 246 is formed by compressing an upper surface and a lower surface of the cap plate 240 so as to form a lower groove 247 facing toward the electrode assembly and an upper groove 248 concavely facing away from the electrode assembly. The safety vent 246 in an exemplary embodiment has a larger cross-sectional area at its center than at its periphery so that it can be destroyed by pressure from gas created when the secondary battery is overcharged, fully discharged, or overheated. The safety vent 246 releases the gas from an interior of the second battery, thereby preventing an explosion of the second battery.

An electrolyte injection hole 242 is formed at the other side of the cap plate 240. After the cap assembly 220 is coupled to the upper opening 210a of the can 210, an electrolyte is injected through the electrolyte injection hole 242 into the can 210. Then, the electrolyte injection hole 242 is sealed with a separate plug 243.

Figure 4A:
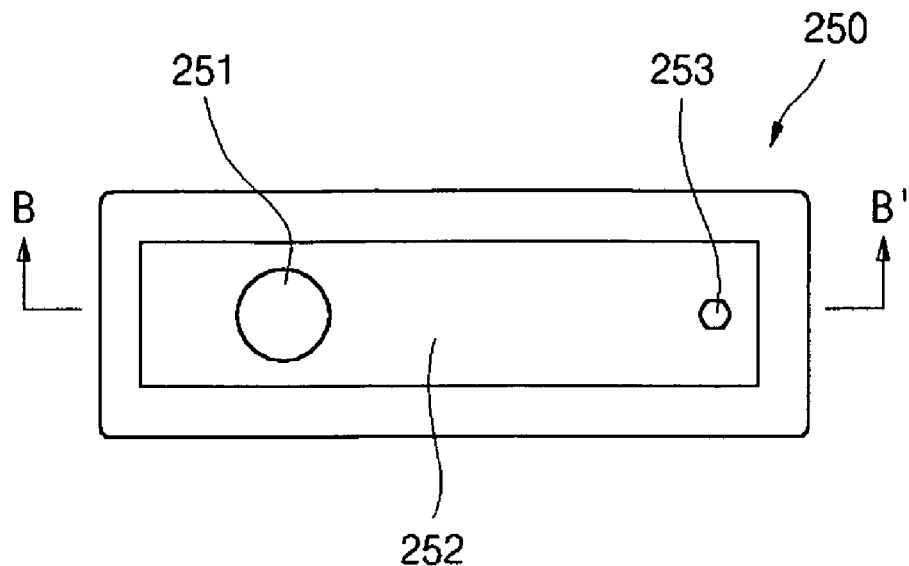
FIG. 4A is a plan view showing another exemplary insulation plate of a lithium secondary battery according to the present invention.
Figure 4B:
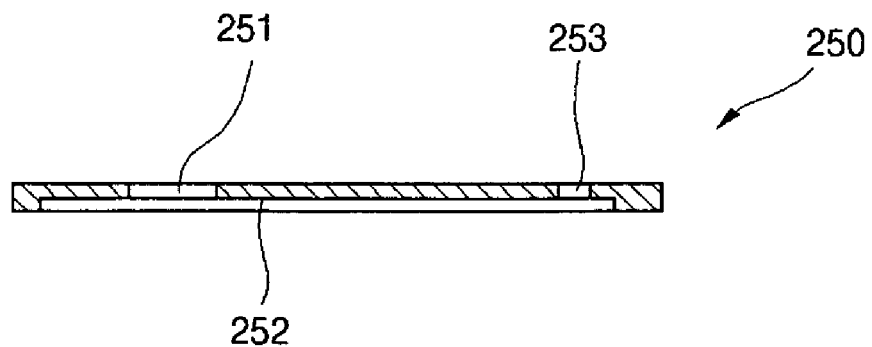
FIG. 4B is a sectional view showing an insulation plate of FIG. 4A taken along a line B-B'.

Referring to FIGS. 4A and 4B, the insulation plate 250 may be made of the same insulation material as that of the insulation gasket and is closely attached to the lower surface of the cap plate 240. The insulation plate 250 has a perforated hole 251, a receiving groove 252, and a insulation plate vent-hole 253 formed therein.

The perforated hole 251, in which the electrode terminal 230 is inserted to extend through the insulation plate 250, is formed at the portion of the insulation plate 250 which corresponds to the perforated hole 241 of the cap plate 240 when the insulation plate 250 is attached to the cap plate 240.

The receiving groove 252 is formed on the lower surface of the insulation plate 250 to have a size corresponding to a terminal plate 260. In one exemplary embodiment, the receiving groove 252 has a depth shallower than a thickness of the terminal plate 260.

The insulation plate vent-hole 253 is formed at a portion of the insulation plate 250 corresponding to the safety vent formed at a side of the cap plate 240 when the insulation plate 250 is attached to the cap plate 240. Thus, when the insulation plate 250 is attached to the cap plate 240, the safety vent 246 of the cap plate 240 is coaxial with the insulation plate vent-hole 253 of the insulation plate 250. The insulation plate vent-hole 253 may be formed smaller than the safety vent 246 so that the electrolyte received in the can 210 is not able to come into full contact with the safety vent 246 when the second battery is dropped. That is, after the pressure of the electrolyte is reduced as it passes through the insulation plate vent-hole 253 when the secondary battery is dropped, the electrolyte then comes in contact with the safety vent 246. Thus, it is possible to prevent the pressure of the electrolyte caused by the drop of the secondary battery from being fully transferred to the safety vent 246. However, the insulation plate vent-hole 253 still allows the gas created by a malfunction of the secondary battery to flow toward the safety vent 246, so that the safety vent 246 is ruptured by the internal pressure of the secondary battery when the internal pressure of the secondary battery increases higher than a critical level. In an exemplary embodiment, the insulation plate vent-hole 253 may be formed to be between about 30% to about 70% of an area of the safety vent 246. If the insulation plate vent-hole 253 is larger than 70% of the area of the safety vent 246, there is a small reduction of the pressure of the electrolyte which passes through the insulation plate vent-hole 253 and contacts the safety vent 246. If the insulation plate vent-hole 253 is smaller than 30% of the area of the safety vent 246, it is difficult to efficiently transfer the pressure of gas created in the can 110 to the safety vent 246. As a result, even though the secondary battery malfunctions, the safety vent 246 cannot be suitably fractured.

Referring back to FIG. 2, the terminal plate 260 may be made of nickel alloy to have a plate shape. The terminal plate 260 is received in the receiving groove 252 formed on a lower surface of the insulation plate 250 and attached to the insulation plate 250. The terminal plate 260 has a perforated hole 261 formed at a portion thereof corresponding to the perforated hole 241 of the cap plate 240, through which the electrode terminal 230 extends. Furthermore, the terminal plate 260 is electrically connected to the electrode terminal 230 and is insulated from the cap plate 240 by the insulation plate 250. The terminal plate 260 has a side end spaced from the insulation plate vent-hole 253 of the insulation plate 250 in order to avoid covering the insulation plate vent-hole 253. Thus, the insulation plate vent-hole 253 can be exposed into the can 110.

The electrode terminal 230 extends through the perforated holes 241, 251, and 261 respectively formed in the cap plate 240, the insulation plate 250, and the terminal plate 260, and is electrically connected to the first electrode tab 217 of the electrode assembly 212. When the electrode terminal 230 is inserted into the perforated hole 241, the electrode terminal 230 is electrically insulated from the cap plate 240 by means of the insulation gasket 235. On the other hand, the electrode terminal 230 may be connected to the second electrode tab 216 of the electrode assembly 212 instead of being connected to the first electrode tab 217.

Figure 5A:
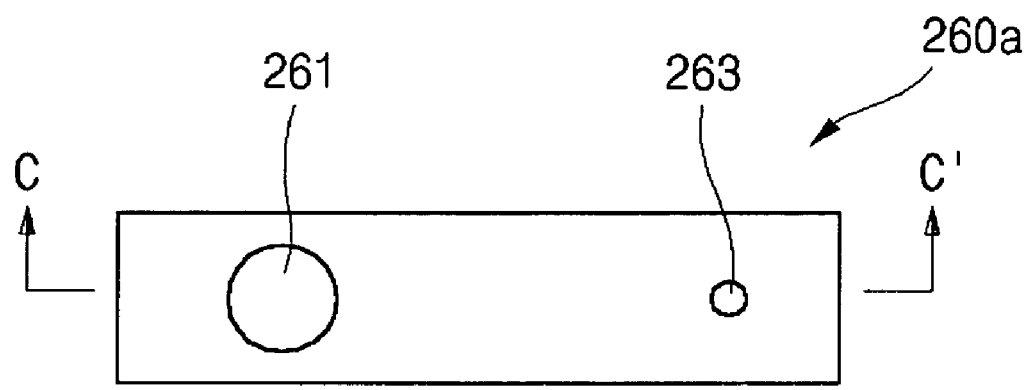
FIG. 5A is a plan view showing another exemplary terminal plate of a lithium secondary battery according to the present invention.
Figure 5B:
FIG. 5B is a sectional view showing the terminal plate of FIG. 5A taken along a line C-C.

FIG. 5A is a plan view showing another exemplary terminal plate of a lithium secondary battery according to the present invention, and FIG. 5B is a sectional view showing the terminal plate of FIG. 5A according to the present invention, taken along a line C-C'. The terminal plate 260a has a terminal plate vent-hole 263 formed at a side thereof. Specifically, the terminal plate vent-hole 263 is formed at a portion of the terminal plate 260a corresponding to the insulation plate vent-hole 253 (as seen in FIGS. 4A and 4B). Further, the terminal plate vent-hole 263 is smaller than the safety vent 246, may be of a size similar to that of the insulation plate vent-hole 253. In one exemplary embodiment, the terminal plate vent-hole 263 has substantially the same size as that of the insulation plate vent-hole 253.

Further, when the insulation plate vent-hole 253 is large, the terminal plate vent-hole 263 may be formed to have a size smaller than the insulation plate vent-hole 253. That is, the terminal plate vent-hole 263 is formed to be of a size to suitably decrease the pressure of an electrolyte passing through the second vent hole. When the secondary battery is dropped, the terminal plate vent-hole 263 can decrease the pressure of the electrolyte applied to the safety vent 246. At this time, the insulation plate vent-hole 253 acts as a conduit for the electrolyte.

The terminal plate 260a is sized to cover the insulation plate vent-hole 253 of the insulation plate 250, and exposes the insulation plate vent-hole 253 through the terminal plate vent-hole 263 to the interior of the can 210. Thus, the terminal plate 260a protects the weaker circumference area of the insulation plate vent-hole 253 of the insulation plate 250.

Hereinafter, an operation of the secondary battery according to the present invention will be described with reference to the accompanying drawings.

Figure 6:
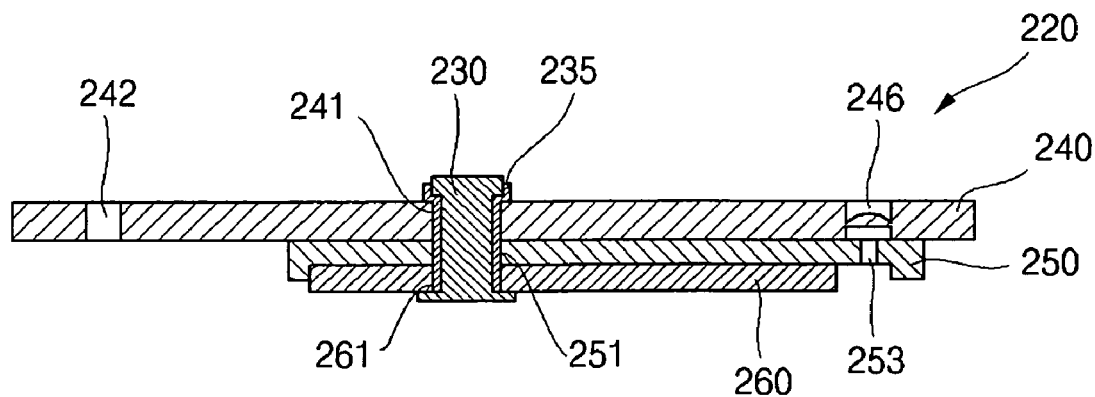
FIG. 6 is a sectional view showing a cap assembly including the insulation plate of FIG. 4A.

FIG. 6 is a sectional view showing a cap assembly of the lithium secondary battery according to the present invention, in which the cap assembly includes the insulation plate of FIGS. 4A and 4B.

Referring to FIG. 6, in the cap assembly 220 according to the present invention, the insulation plate 250 is attached to the lower surface of the cap plate 240 and the terminal plate 260 is attached to the lower surface of the insulation plate. The plates 240, 250, and 260 are attached to one another such that the perforated holes 241, 251, and 261 respectively formed on each plate 240, 250, and 260 are coaxial with one another. The insulation plate vent-hole 253 is formed at a side of the insulation plate 250 corresponding to the safety vent 246 formed at a side of the cap plate 240. Further, the terminal plate 240 has an end spaced from the insulation plate vent-hole 253 so as to expose the insulation plate vent-hole 253 to the interior of the can 210. Thus, the gas created by a malfunction of the secondary battery passes through the insulation plate vent-hole 253 toward the safety vent 246. When the pressure of the created gas is higher than a critical point, the safety vent 246 is fractured so that the gas is channeled outside the can 210. If the secondary battery is dropped upside-down, the pressure of the electrolyte in the can 210 is reduced while passing through the insulation plate vent-hole 253. Thus, when the electrolyte comes in contact with the safety vent 246, the reduced pressure of the electrolyte is applied to the safety vent 246 rather than the full pressure of the electrolyte.

Figure 7:
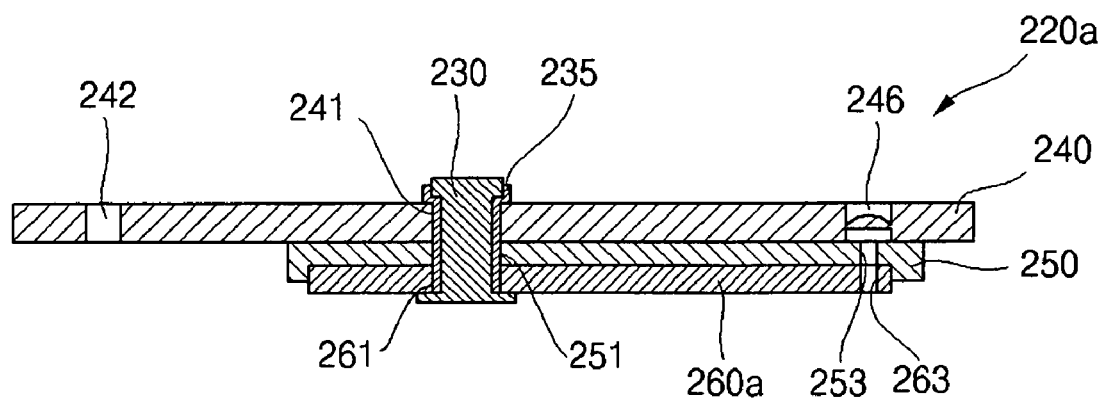
FIG. 7 is a sectional view showing a cap assembly including the terminal plate of FIG. 5A.

FIG. 7 is a sectional view showing a cap assembly of the lithium secondary battery according to an exemplary embodiment of the present invention, in which the cap assembly includes the terminal plate of FIGS. 5A and 5B. The insulation plate 250 is attached to the lower surface of the cap plate 240 and the terminal plate 260a is attached to the lower surface of the insulation plate 250. The plates 240, 250, and 260 are attached to one another such that the perforated holes 241, 251, and 261 respectively formed on each plate 240, 250, and 260 are coaxial with one another. The terminal plate 260a has a terminal plate vent-hole 263 formed at a portion thereof corresponding to the insulation plate vent-hole 253. Thus the safety vent 246 may be partially exposed to the interior of the can 210 through both the insulation plate and the terminal plate vent holes 253, 263. Therefore, gas which is created by a malfunction of the secondary battery can pass through the insulation plate vent-hole 253 toward the safety vent 246. When the pressure of the gas is higher than a critical point, the pressure of the gas causes the safety vent 246 to fracture allowing the gas to be channeled out of the can 210. If the secondary battery is dropped upside-down, the pressure of the electrolyte in the can 210 is reduced while passing through both the insulation plate and the terminal plate vent-holes 253, 263. Thus, when the electrolyte comes in contact with the safety vent 246, the reduced pressure of the electrolyte is applied to the safety vent 246 rather than the full pressure of the electrolyte. Further, since the insulation plate 250 is made of the same organic material as the gasket, the insulation plate vent-hole 253 is relatively weak. However, the insulation plate 250 is covered with the terminal plate 260a and is protected from being exposed to the interior of the can 210.

In the secondary battery according to the present invention, each of the insulation plate and the terminal plate of the cap assembly have a hole which has a predetermined size and is formed at the portion thereof corresponding to the safety vent of the cap plate. When the secondary battery is dropped, the pressure of the electrolyte is reduced while passing through the vent hole, preventing the safety vent from being fractured by the electrolyte.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lithium secondary battery comprising:
   an electrode assembly comprising a first electrode plate, a second electrode plate, and a separator between the first electrode plate and the second electrode plate;
   a can housing the electrode assembly and an electrolyte; and
   a cap assembly coupled to an upper opening of the can to seal the can, the cap assembly including a cap plate, an insulation plate coupled to a can interior-facing surface of the cap plate, a terminal plate coupled to a can interior-facing surface of the insulation plate, and an electrode terminal inserted through the cap plate, the insulation plate and the terminal plate and electrically coupled to the electrode assembly,
   wherein the cap plate includes a fracturable safety vent,
   wherein the insulation plate electrically insulates the terminal plate from the cap plate; and
   wherein the insulation plate has an insulation plate vent-hole passing through the insulation plate at a portion corresponding to the safety vent.

2. The lithium secondary battery as claimed in claim 1, wherein the insulation plate vent-hole is exposed toward an inside of the can.

3. The lithium secondary battery as claimed in claim 1, wherein the insulation plate vent-hole has an area smaller than an area of the safety vent.

4. The lithium secondary battery as claimed in claim 3, wherein the insulation plate vent-hole has an area about 70% of the area of the safety vent.

5. The lithium secondary battery as claimed in claim 3, wherein the insulation plate vent-hole has an area about 30% of the area of the safety vent.

6. The lithium secondary battery as claimed in claim 1, wherein the terminal plate has a terminal plate vent-hole formed passing through the terminal plate and corresponding to the insulation plate vent-hole.

7. The lithium secondary battery as claimed in claim 6, wherein the terminal plate vent-hole has at least the same area as an area of the insulation plate vent-hole.

8. The lithium secondary battery as claimed in claim 6, wherein the terminal plate vent-hole has a smaller area than an area of the insulation plate vent-hole.

9. The lithium secondary battery as claimed in claim 1, wherein the first electrode plate forms a negative electrode plate, and the second electrode plate forms a positive electrode plate.

10. The lithium secondary battery as claimed in claim 1, wherein the fracturable safety vent has a pair of grooves forming a membrane located within the cap plate, wherein the membrane is thicker at a center than at a peripheral edge.

11. In a lithium secondary battery having an electrode assembly, a can, a fracturable safety vent and electrolyte in the can, a method for allowing gas to be exhausted from the can while preventing fracture of the fracturable safety vent by the electrolyte, the method comprising:
   providing a cap assembly having a cap plate, an insulation plate coupled to a can interior-facing surface of the cap plate, a terminal plate coupled to a can interior-facing surface of the insulation plate, and an electrode terminal inserted through the cap plate, the insulation plate and the terminal plate being coupled to the electrode assembly, and the cap plate housing the fracturable safety vent, wherein the insulation plate electrically insulates the terminal plate from the cap plate; and
   mounting the insulation plate to the cap plate such that an insulation plate vent-hole is aligned with the fracturable safety vent, the insulation plate vent-hole being sized to reduce electrolyte contact with the safety vent.

12. The method of claim 11, wherein the insulation plate vent-hole has an area smaller than an area of the fracturable safety vent.

13. The method of claim 12, wherein the insulation plate vent-hole has an area of between about 30% to about 70% of the area of the safety vent.

14. The method of claim 11, wherein the terminal plate has a terminal plate vent-hole passing through the terminal plate corresponding to the insulation plate vent-hole.

15. The method of claim 14, wherein the terminal plate vent-hole has at least the same area as an area of the insulation plate vent-hole.

16. The method of claim 14, wherein the terminal plate vent-hole has a smaller area than an area of the insulation plate vent-hole.

* * * * *

UNITED STATES PATENT AND TRADEMARK OFFICE
CERTIFICATE OF CORRECTION

| | | |
|---|---|---|
| PATENT NO. | : 7,754,372 B2 | Page 1 of 1 |
| APPLICATION NO. | : 11/377950 | |
| DATED | : July 13, 2010 | |
| INVENTOR(S) | : Teak Hyen Kwon et al. | |

It is certified that error appears in the above-identified patent and that said Letters Patent is hereby corrected as shown below:

In the Claims

Column 7, Claim 1, line 29     Before "electrically" Delete "and" Insert -- are --

Column 8, Claim 11, line 19     After "method" Insert -- is provided --

Signed and Sealed this

Twenty-ninth Day of November, 2011

David J. Kappos
*Director of the United States Patent and Trademark Office*